(12) United States Patent
Maeng et al.

(10) Patent No.: US 11,709,532 B2
(45) Date of Patent: Jul. 25, 2023

(54) SHARED BATTERY SYSTEM AND METHOD OF CONTROLLING BATTERY ON A SHARED MOBILITY DEVICE

(71) Applicants: Hyundai Motor Company, Seoul (KR); Kia Motors Corporation, Seoul (KR)

(72) Inventors: Cheon Maeng, Yongin-si (KR); Young Ki Kim, Gunpo-si (KR); Sung Un Kim, Yongin-si (KR); Jae Yong Lee, Chungju-si (KR); Sung Jin Choi, Gwangmyeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 515 days.

(21) Appl. No.: 16/714,075

(22) Filed: Dec. 13, 2019

(65) Prior Publication Data

US 2021/0034123 A1 Feb. 4, 2021

(30) Foreign Application Priority Data

Aug. 1, 2019 (KR) .......................... 10-2019-0093855

(51) Int. Cl.
*G06F 1/26* (2006.01)
*G06F 21/31* (2013.01)
(Continued)

(52) U.S. Cl.
CPC ................ *G06F 1/26* (2013.01); *B60L 53/66* (2019.02); *G06F 21/31* (2013.01); *G06Q 50/06* (2013.01);
(Continued)

(58) Field of Classification Search
CPC . G06F 1/26; G06F 21/31; B60L 53/66; B60L 2200/12; B60L 53/80; B60L 53/665; B60L 2200/46; B60L 53/305; B60L 53/53; B60L 58/16; B60L 2200/24; B60L 2250/18; B60L 2250/20; B60L 2270/30;
(Continued)

(56) References Cited

U.S. PATENT DOCUMENTS 10,683,048 B2 * 6/2020 Mai ........................ B62H 5/001
11,001,231 B1 * 5/2021 Hedman ................ G06V 10/82
(Continued)

*Primary Examiner* — Danny Chan
(74) *Attorney, Agent, or Firm* — Slater Matsil, LLP

(57) ABSTRACT

A shared battery system includes a battery having unique identification information, a communication unit communication-connected with a user terminal to receive user information from the user terminal, and an authentication unit configured to perform user authentication based on the user information. A controller is configured to control the authentication unit to perform the user authentication when a communication connection with the user terminal is made, to control the battery to supply electrical energy to a shared mobility device based on a use approval of the shared mobility device when the battery is mounted to the mobility device, to acquire usage information of the shared mobility device therefrom when the electrical energy is supplied to the shared mobility device, and to control the communication unit to transmit the acquired usage information of the shared mobility device and status information of the battery.

4 Claims, 5 Drawing Sheets

(51) Int. Cl.
  *G06Q 50/06* (2012.01)
  *H02J 7/00* (2006.01)
  *B60L 53/66* (2019.01)

(52) U.S. Cl.
  CPC .......... *H02J 7/005* (2020.01); *H02J 7/00034* (2020.01); *B60L 2200/12* (2013.01)

(58) Field of Classification Search
  CPC ...... G06Q 50/06; G06Q 50/30; G06Q 20/382; G06Q 30/0645; H02J 7/00034; H02J 7/005; H02J 2310/48; H02J 7/00032; H02J 7/00045; H02J 7/0047; Y02T 10/70; Y02T 10/7072; Y02T 90/12; Y02T 90/16; G01R 31/392; B60Y 2200/126; B60Y 2200/13; B60Y 2200/91
  See application file for complete search history.

(56) References Cited

U.S. PATENT DOCUMENTS

| | | | |
|---|---|---|---|
| 2007/0192599 A1* | 8/2007 | Kato | H04L 9/16 713/168 |
| 2012/0146429 A1* | 6/2012 | Seol | B62M 6/90 307/116 |
| 2014/0074329 A1* | 3/2014 | Yang | B60L 58/12 903/930 |
| 2014/0097672 A1* | 4/2014 | Takemura | B62H 5/00 307/116 |
| 2014/0167657 A1* | 6/2014 | Nishikawa | B60L 58/15 320/134 |
| 2016/0209472 A1* | 7/2016 | Chow | G01R 31/367 |
| 2017/0063110 A1* | 3/2017 | Toya | H02J 7/00036 |
| 2017/0064495 A1* | 3/2017 | Toya | H04W 4/80 |
| 2019/0176639 A1* | 6/2019 | Kumar | B60L 3/0046 |
| 2021/0004882 A1* | 1/2021 | Nakajima | G06Q 30/0601 |
| 2021/0192645 A1* | 6/2021 | Kawamura | H01M 10/425 |
| 2021/0316633 A1* | 10/2021 | Kalligeros | B62H 5/001 |

* cited by examiner

SHARED BATTERY SYSTEM AND METHOD OF CONTROLLING BATTERY ON A SHARED MOBILITY DEVICE

CROSS-REFERENCE TO RELATED APPLICATIONS

This application claims priority to Korean Patent Application No. 10-2019-0393855, filed on Aug. 1, 2019, which application is hereby incorporated herein by reference.

TECHNICAL FIELD

The present invention relates to a shared battery system and method of controlling battery.

BACKGROUND

As one plan for improvement of the environment, electric vehicles, electric bicycles, electric motor scooters, electric kickboards, etc. have been developed and run. The development of such various electric mobility devices is expected to be more remarkably made in future.

Recently, sharing services sharing a variety of electric mobility devices have been developed to provide a lot of convenience to users.

In an electric bicycle sharing service and an electric kickboard sharing service being now advanced in enterprises or public institutions, a personal user may use an electric bicycle or an electric kickboard by obtaining permission to use the electric bicycle or electric kickboard through a smartphone application and releasing a locking unit thereof.

In addition, the user may select and use a charged electric bicycle or electric kickboard, or use an electric bicycle or an electric kickboard after charging the same at a charging station.

However, in the electric bicycle sharing service and the electric kickboard sharing service, a charging station and separate personnel for charging should be provided to recharge the used bicycle or kickboard for reuse thereof. For this reason, there is a need for a place where the charging station is installable, and a charging station installation cost and an additional labor cost for the separate personnel are required.

In addition, in a shared mobility device using electricity, a battery occupies a considerable portion of cost. For this reason, theft and damage of the battery may deteriorate mobility sharing service business.

Accordingly, there is, in future, a need for development of a shared battery system which is capable of minimizing a cost required to charge a battery, as well as risk of theft and damage of the battery, through a battery personalization service, and being applied to all shared mobility devices using the battery.

SUMMARY

Embodiments relate to a shared battery system which enables a plurality of shared devices to be used through matching with a user using personal authentication of a battery, a method of controlling a battery thereof and a mobility sharing service system including the same.

Accordingly, the present invention is directed to a shared battery system, a method of controlling a battery thereof and a mobility sharing service system including the same. Embodiments can substantially obviate one or more problems due to limitations and disadvantages of the related art.

Embodiments of the present invention provide a shared battery system which is capable of performing user authentication to match a battery having unique identification information with user information of a user terminal, and allowing a user to mount the user information-matched battery to a shared mobility device to use the mobility device, thereby making it possible to minimize a cost required to charge the battery, as well as risk of theft and damage of the battery, through a battery personalization service, and to be applied to all shared mobility devices using the battery, a method of controlling a battery thereof and a mobility sharing service system including the same.

Advantages of the present invention devised to solve the problems are not limited to the aforementioned issues, and other unmentioned objects will be clearly understood by those skilled in the art based on the following detailed description of the present invention.

In one example, a shared battery system includes a battery having unique identification information, a communication unit communication-connected with a user terminal to receive user information from the user terminal, an authentication unit for performing user authentication based on the user information, and a controller for controlling the battery, the communication unit and the authentication unit. The controller controls the authentication unit to perform the user authentication when a communication connection with the user terminal is made, controls the battery to supply electrical energy to a shared mobility device based on a use approval of the shared mobility device when the battery is mounted to the mobility device, acquires usage information of the shared mobility device therefrom when the electrical energy is supplied to the shared mobility device, and controls the communication unit to transmit the acquired usage information of the shared mobility device and status information of the battery to the user terminal.

In another aspect of the present invention, a method of controlling a battery of a shared battery system includes making a communication connection with a user terminal, performing user authentication with respect to the user terminal, determining whether the battery is mounted to a shared mobility device, determining whether use of the shared mobility device is approved, supplying electrical energy to the shared mobility device upon determining that the use of the shared mobility device is approved, acquiring usage information of the shared mobility device therefrom, transmitting the acquired usage information of the shared mobility device and status information of the battery to the user terminal, and ending a control process when the battery is detached from the shared mobility device.

In another aspect of the present invention, a method of controlling a battery of a shared battery system includes making a communication connection with a user terminal, determining whether a communication connection with another user terminal is currently being made, upon receiving a communication connection request from the user terminal, diagnosing a State Of Health (SOH) of the battery unless the communication connection with the other user terminal is currently being made, and determining based on a result of the diagnosis whether the battery is available, determining that the battery is available, when the battery SOH is greater than a reference value, and performing user authentication with respect to the user terminal, completing pairing with the user terminal upon completion of the user authentication, determining whether the battery is mounted to a shared mobility device, determining whether use of the shared mobility device is approved, supplying electrical energy to the shared mobility device upon determining that the use of the shared mobility device is approved, acquiring usage information of the shared mobility device therefrom once the mobility device begins to be run, and transmitting the acquired usage information of the shared mobility device and status information of the battery to the user terminal, determining whether running of the shared mobility device is finished, diagnosing the entire shared battery system when the running of the shared mobility device is determined to be finished, to determine whether the entire shared battery system is normal, and ending driving of the shared battery system upon determining that the entire shared battery system is normal.

In a further aspect of the present invention, a computer-readable recording medium for storing a program for executing a method of controlling a battery of a shared battery system executes processes included in the battery control method.

In another aspect of the present invention, a mobility sharing service system includes a shared battery system detachably mounted to a shared mobility device to supply electrical energy thereto, a user terminal communication-connected with the shared battery system to perform user authentication and receive usage information and battery information of the shared mobility device corresponding to use of the shared mobility device from the shared battery system, and a mobility sharing service server communication-connected with the user terminal to receive the usage information and battery information of the shared mobility device from the user terminal and charge a usage fee based on the received usage information and battery information, wherein the shared battery system performs the user authentication upon being communication-connected with the user terminal, supplies the electrical energy to the shared mobility device based on a use approval of the shared mobility device upon being mounted to the mobility device, acquires the usage information of the shared mobility device therefrom when the electrical energy is supplied to the shared mobility device, and transmits the acquired usage information of the shared mobility device and battery status information to the user terminal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF ILLUSTRATIVE EMBODIMENTS

Figure 1:
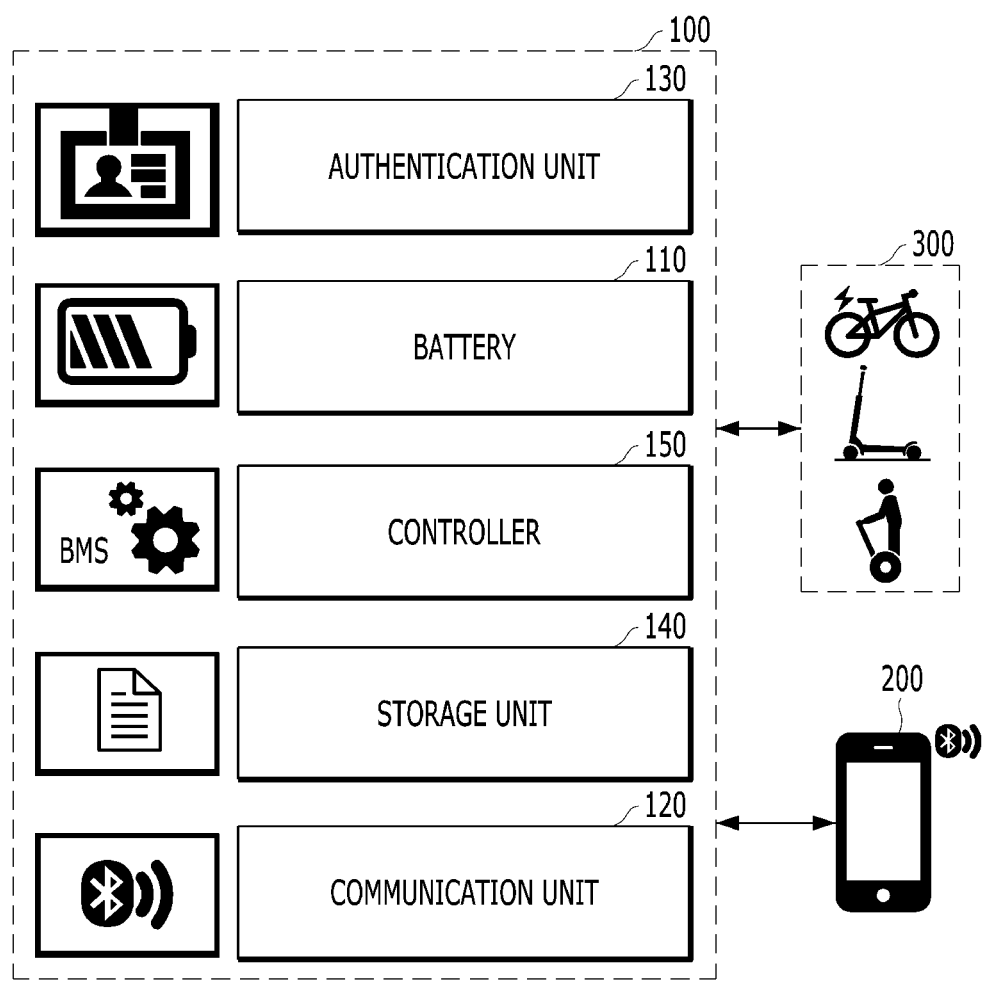
FIG. 1 is a view illustrating a shared battery system according to one embodiment of the present invention.

Reference will now be made in detail to the preferred embodiments of the present invention, examples of which are illustrated in the accompanying drawings. The following embodiments are given by way of example in order to enable those skilled in the art to fully understand the idea of the present invention. Therefore, the present invention is not limited by the following embodiments, and may be realized in various other forms. In order to clearly describe the present invention, parts having no relation to the description of the present invention have been omitted from the drawings. Wherever possible, the same reference numerals will be used throughout the specification to refer to the same or like parts.

The term "comprises" or "includes" used herein should be interpreted not to exclude other elements but to further include such other elements, unless mentioned otherwise. In addition, the term "unit" or "module" used herein signifies one unit that processes at least one function or operation, and may be realized by hardware, software, or a combination thereof.

Hereinafter, a shared battery system, a method of controlling a battery thereof and a mobility sharing service system including the same, which may be applied to embodiments of the present invention, will be described in detail with reference to FIGS. 1 to 5.

FIG. 1 is a view illustrating a shared battery system according to one embodiment of the present invention.

As shown in FIG. 1, the shared battery system according to the present embodiment, denoted by reference numeral 100, may include a battery no having unique identification information, a communication unit 120 communication-connected with a user terminal 200 to receive user information from the user terminal 200, an authentication unit 130 for performing user authentication based on the user information, and a controller 150 for controlling the battery no, the communication unit 120 and the authentication unit 130.

Here, the controller 150 may control the authentication unit 130 to perform the user authentication when a communication connection with the user terminal 200 is made, and may control the battery no to supply electrical energy to a shared mobility device 300 based on a use approval of the shared mobility device 300 when the battery no is mounted to the mobility device 300. In addition, the controller 150 may acquire usage information of the shared mobility device 300 therefrom when the electrical energy is supplied to the shared mobility device 300, and control the communication unit 120 to transmit the acquired usage information of the shared mobility device 300 and status information of the battery no to the user terminal 200.

In some cases, the shared battery system 100 may further include a storage unit 140 for storing the status information of the battery no and the usage information of the shared mobility device 300.

In addition, when the battery no is mounted to the shared mobility device 300, the communication unit 120 may be communication-connected with the mobility device 300 to receive the usage information thereof.

In addition, when the communication connection with the user terminal 200 is made, the controller 150 may determine whether a communication connection with another user terminal is currently being made, upon receiving a communication connection request from the user terminal 200, and make the communication connection with the user terminal 200 unless the communication connection with the other user terminal is currently being made.

Here, unless the communication connection with the other user terminal is currently being made, the controller 150 may make the communication connection with the user terminal 200 and control the communication unit 120 to create a use enable notification and transmit the same to the user terminal 200.

In addition, when the communication connection with the user terminal 200 is made, the controller 150 may determine whether a communication connection with another user terminal is currently being made, upon receiving a communication connection request from the user terminal 200, and release the communication connection with the user terminal 200 if the communication connection with the other user terminal is currently being made.

Here, if the communication connection with the other user terminal is currently being made, the controller 150 may release the communication connection with the user terminal 200 and control the communication unit 120 to create a use disable notification and transmit the same to the user terminal 200.

Next, when the communication connection with the user terminal 200 is made, the controller 150 may diagnose a State Of Health (SOH) of the battery no and determine based on a result of the diagnosis whether the battery no is available.

Here, when the battery SOH is greater than a reference value, the controller 150 may determine that the battery no is available.

For example, when the battery SOH is greater than the reference value, the controller 150 may determine that the battery no is available, and control the communication unit 120 to create a use enable notification and transmit the same to the user terminal 200.

On the other hand, when the battery SOH is less than or equal to the reference value, the controller 150 may determine that the battery no is not available.

For example, when the battery SOH is less than or equal to the reference value, the controller 150 may determine that the battery no is not available, and control the communication unit 120 to create a use disable notification and transmit the same to the user terminal 200.

Next, when the user authentication is performed, the controller 150 may control the authentication unit 130 to perform the user authentication based on the user information and match the unique identification information of the battery no with the user terminal 200 when the user authentication is completed.

Here, the controller 150 may control the authentication unit 130 to perform the user authentication as to payment of a user and whether the user is an unauthorized user, based on the user information.

Then, when the battery no is mounted to the shared mobility device 300, the controller 150 may control the communication unit 120 to be communication-connected with the shared mobility device 300. Upon being communication-connected with the shared mobility device 300, the controller 150 may request use approval to the mobility device 300 and control the battery no to supply the electrical energy to the mobility device 300 upon completion of the use approval from the mobility device 300.

Here, the controller 150 may provide user authentication completion information to the shared mobility device 300 when requesting the use approval thereto.

In addition, when acquiring the usage information from the shared mobility device 300, the controller 150 may acquire the usage information in real time once the mobility device 300 begins to be run.

For example, the usage information may include voltage, current, temperature, position and speed information acquired according to the running of the shared mobility device 300, but is not limited thereto.

Next, when the acquired usage information of the shared mobility device 300 and the status information of the battery no are transmitted to the user terminal 200, the controller 150 may analyze a running pattern and a battery use pattern of a user using the shared mobility device 300 based on the acquired usage information of the shared mobility device 300 and the status information of the battery no and control the communication unit 120 to transmit the analyzed user running pattern and battery use pattern to at least one of the user terminal 200 and an external server.

In addition, when the acquired usage information of the shared mobility device 300 and the status information of the battery no are transmitted to the user terminal 200, the controller 150 may analyze a battery use pattern based on the acquired usage information of the shared mobility device 300 and the status information of the battery no and estimate the remaining lifespan of the battery no based on the analyzed battery use pattern.

Then, when the running of the shared mobility device 300 is determined to be finished, the controller 150 may diagnose the entire shared battery system, and end the driving of the shared battery system upon determining based on a result of the diagnosis that the entire shared battery system is normal.

Here, unless the entire shared battery system is normal, the controller 150 may control the communication unit 120 to create notification information regarding an abnormal part of the shared battery system and transmit the same to the user terminal 200.

As stated above, the present invention may provide an authentication function through matching with a user using a unique identifier (ID) of a battery itself and enable the user to use a plurality of shared devices after authentication.

The present invention may provide a system including a built-in battery storing energy, which may not only supply the energy, but also have a unique ID assigned individually thereto.

In addition, the present invention may perform matching between an individual battery ID and a personal user when the user communicates with a communication module through a smartphone under the condition of having a prescribed condition.

In the case where the battery system of the present invention is mounted to a shared mobility product such as an electric bicycle, a user matched with an ID assigned to a battery may be determined to be a valid user (authorized user) through a communication function, and the controller may supply power to the mobility product to operate the same.

In a shared mobility product using electricity, a battery occupies a considerable portion of cost. For this reason, frequent theft, damage and charging of the battery may deteriorate a sharing business model. However, as described above, according to the present invention, the battery system corresponding to the energy of the shared mobility product may be held by an individual, and may effectively act as an energy source and an authentication key.

Figure 2:
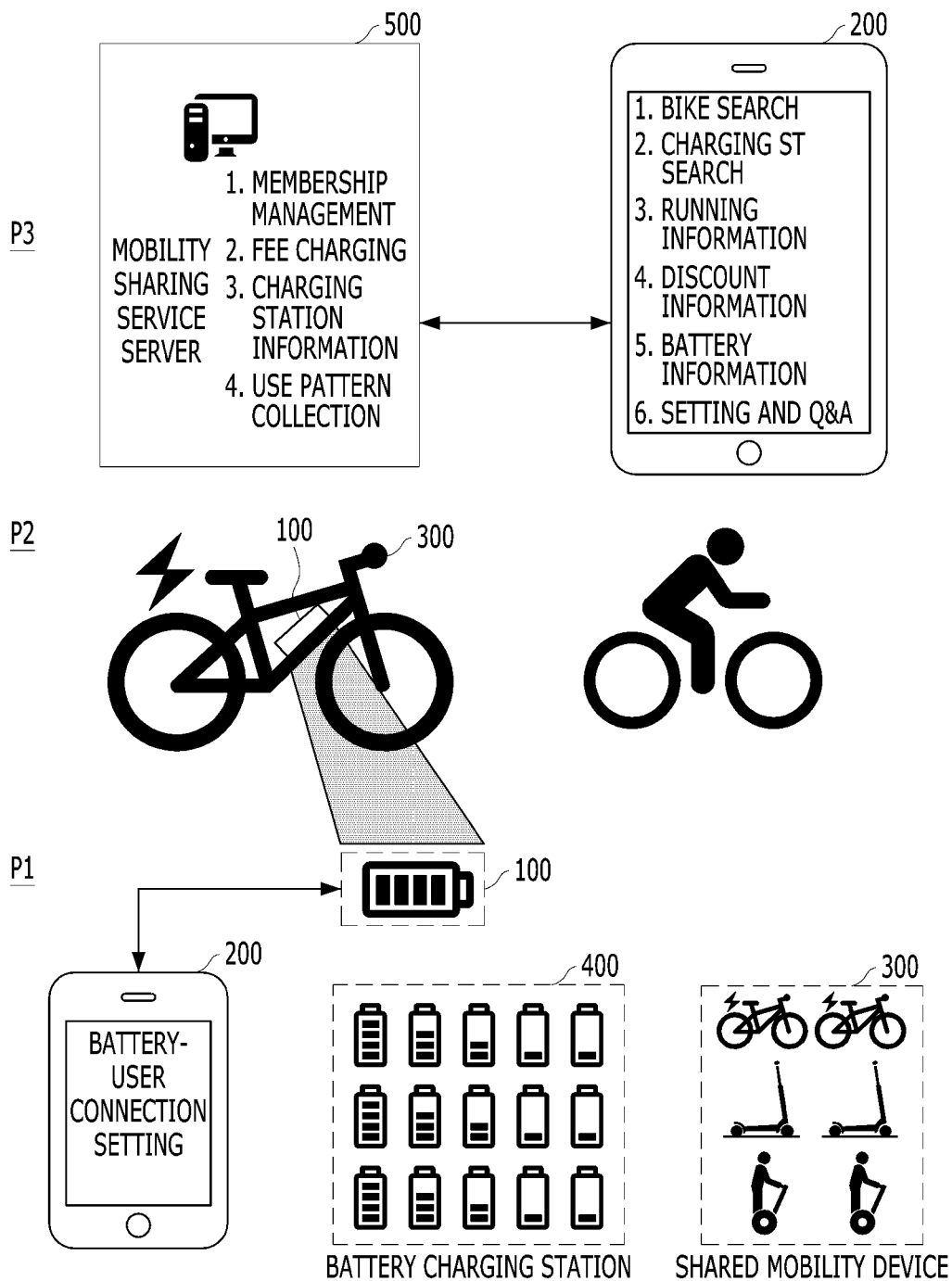
FIG. 2 is a view illustrating a mobility sharing service system including the shared battery system according to the one embodiment of the present invention.

FIG. 2 is a view illustrating a mobility sharing service system including the shared battery system according to the one embodiment of the present invention.

As shown in FIG. 2, the shared battery system of the present invention is also applicable to the mobility sharing service system.

The mobility sharing service system may include the shared battery system 100 which is detachably mounted to the shared mobility device 300 to supply electrical energy thereto, the user terminal 200 which is communication-connected with the shared battery system 100 to perform user authentication and receive usage information and battery information of the shared mobility device 300 corresponding to use of the shared mobility device 300 from the shared battery system 100, and a mobility sharing service server 500 which is communication-connected with the user terminal 200 to receive the usage information and battery information of the shared mobility device 300 from the user terminal 200 and charge a usage fee based on the received usage information and battery information.

Here, the shared battery system 100 may perform the user authentication upon being communication-connected with the user terminal 200, and supply the electrical energy to the shared mobility device 300 based on a use approval of the shared mobility device 300 upon being mounted to the mobility device 300. In addition, the shared battery system 100 may acquire the usage information of the shared mobility device 300 therefrom when the electrical energy is supplied to the shared mobility device 300, and transmit the acquired usage information of the shared mobility device 300 and battery status information to the user terminal 200.

The mobility sharing service server 500 may analyze a running pattern and a battery use pattern of a user using the shared mobility device 300 based on the shared mobility device usage information and battery information, and provide individually tailored fee charging, reward and promotion based on a result of the analysis.

In addition, the mobility sharing service server 500 may provide charging station information for charging of a battery of the shared battery system 100 to the user terminal 200.

As described above, the present invention has a permission/control function of enabling a user to use a shared electric mobility device using a personal authentication function of a large-capacity battery, and a function of processing battery use and running-associated data.

In first process P1 of FIG. 2, the user terminal 200, such as a smartphone, is connected with the shared battery system 100, so that a personal user and a unique ID of a battery are paired for matching between the user and the battery.

At this time, a determination is made as to whether the user has paid a usage fee or the user is an authorized user.

In addition, a determination is made as to whether there is matching between the battery ID and another user. Only when the battery ID is free, may the battery and the user be paired.

Here, the SOH and damage of the battery may be checked through the battery ID. Only when the battery is available, may it be paired with the user.

After the user and the battery are paired, the user may personally charge and use the battery as needed.

Next, in second process P2, the shared battery system 100 charged and paired with the personal user may be mounted to the shared mobility device 300.

When the battery is determined to be an authenticated one, the shared mobility device 300 is changed to a standby mode where it is operable.

Thereafter, the user acquires battery usage information while traveling using the shared mobility device 300.

Then, the present invention may check a running distance to electrical energy consumption of the battery using the battery usage information to check electricity efficiency for use of the shared mobility device 300 by the user, and may store a use pattern (including high-rate discharge, a temperature condition, etc.) accelerating aging of the battery.

In the service business, reward may be provided to an ECO user based on the above information.

This information may be additional information in use of the shared mobility device by the user.

Next, in third process P3, a user-customized fee may be charged to the user based on a running history and battery use conditions (a load condition, a temperature condition, etc.) after use of the shared mobility device 300 by the user.

The user terminal 200 may search for a charging station for battery charging through a charging station search function.

That is, the present invention may invite the user to check whether to arrive at a destination with the current State Of Charge (SOC) of the battery in consideration of the distance to the destination obtained through running information and to charge the battery in advance depending on the running purpose and the distance.

For example, the mobility sharing service server 500 may provide services such as membership management, fee charging, charging station information, and user-shared mobility use pattern collection.

Through the services of the present invention, the user terminal 200 may perform functions such as shared mobility device 300 search, battery charging station 400 search, shared mobility device 300 running information, discount information, battery information, and setting.

Figure 3:
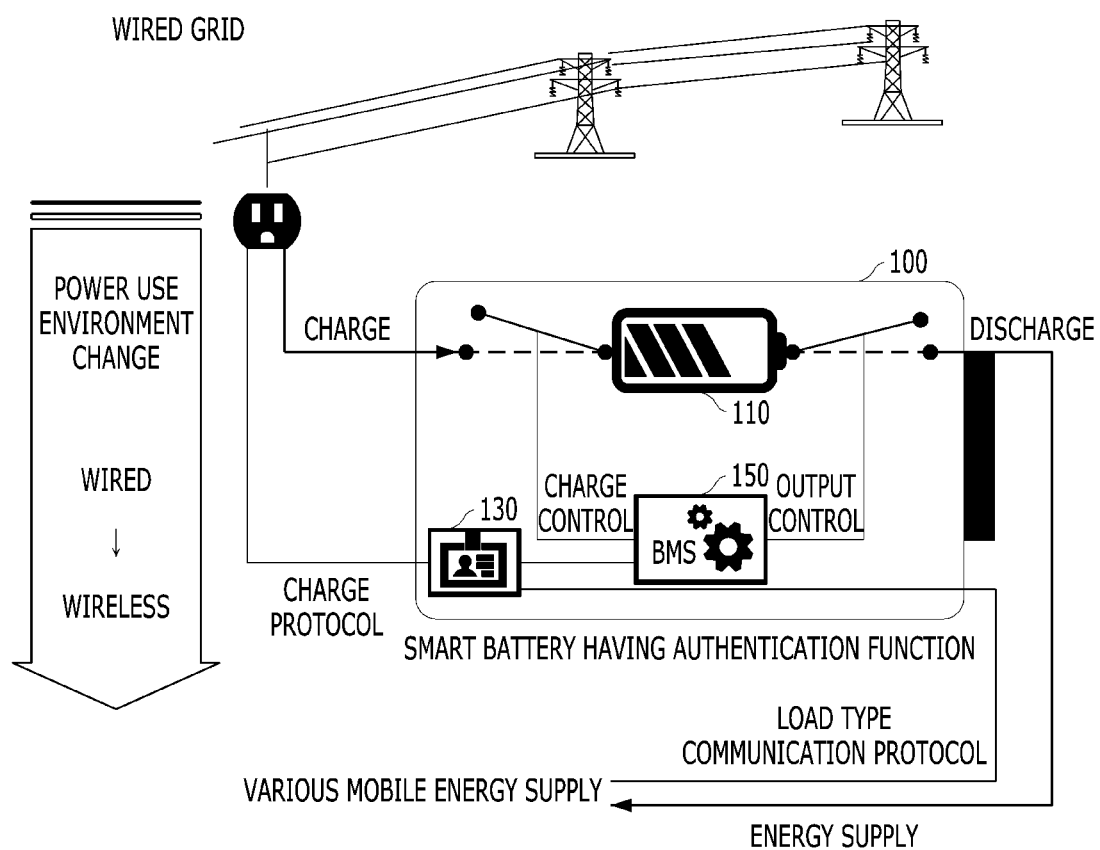
FIG. 3 is a view illustrating a mobile application of the shared battery system of the present invention to a grid.

FIG. 3 is a view illustrating a mobile application of the shared battery system of the present invention to a grid.

As shown in FIG. 3, the shared battery system having the user authentication function according to the present invention enables the mobile application to the grid.

The meaning itself of connecting to a general wired grid to use electricity may involve the meaning of using a load (node) applied to a power supplier.

Namely, connecting to the existing power industry by wire acts as a kind of authentication.

Provided that future power use itself is changed to a mobile form (battery) as in the present invention, there will be a need for methods of calculating electricity consumption as in an existing electric meter and permitting connection to a main grid. Here, a battery of a user authentication function will have very large advantages and meaning.

The present invention may be an effective technique for smart grid environment construction in that the overall mobile energy flow path within the entire grid can be seen through battery discharge environments (energy use location, temperature, environmental conditions, etc.).

Figure 4:
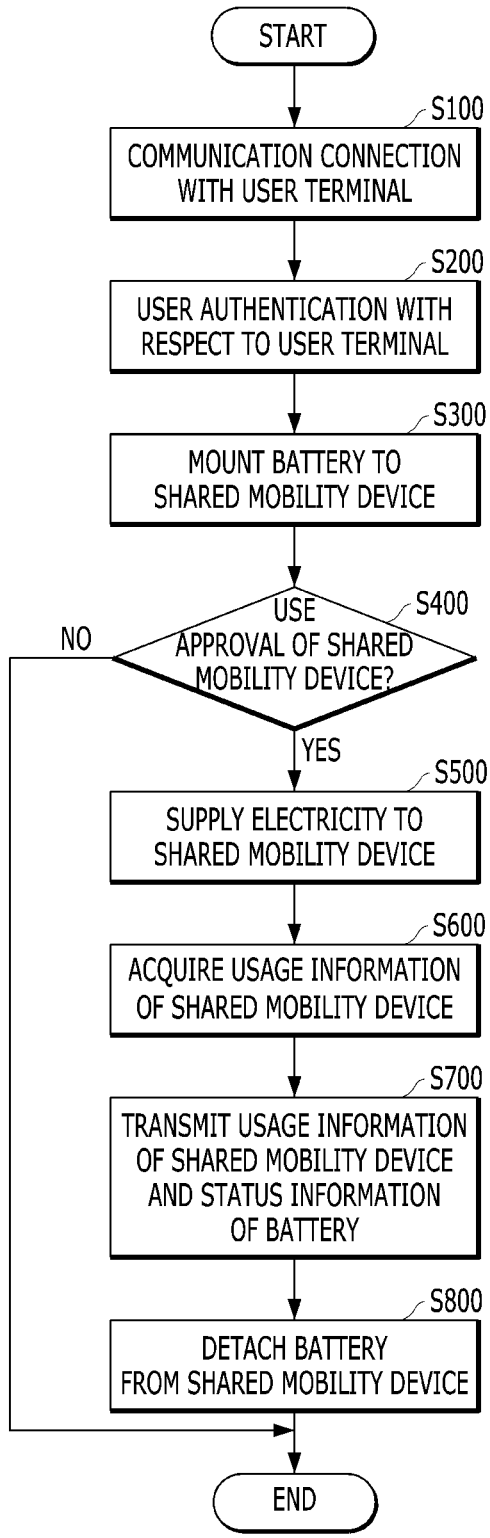
FIG. 4 is a flowchart illustrating a method of controlling a battery of the shared battery system according to the one embodiment of the present invention.

FIG. 4 is a flowchart illustrating a method of controlling a battery of the shared battery system according to the one embodiment of the present invention.

As shown in FIG. 4, the present invention may make a communication connection with a user terminal (S100).

Here, upon receiving a communication connection request from the user terminal, the present invention may determine whether a communication connection with another user terminal is currently being made, and make the communication connection with the user terminal unless the communication connection with the other user terminal is currently being made.

Upon making the communication connection with the user terminal, the present invention may create a use enable notification and transmit the same to the user terminal.

Alternatively, upon receiving a communication connection request from the user terminal, the present invention may determine whether a communication connection with another user terminal is currently being made, and release the communication connection with the user terminal if the communication connection with the other user terminal is currently being made.

Here, upon releasing the communication connection with the user terminal, the present invention may create a use disable notification and transmit the same to the user terminal.

In addition, when the communication connection with the user terminal is made, the present invention may diagnose a State Of Health (SOH) of the battery and determine based on a result of the diagnosis whether the battery is available.

Here, when the battery SOH is greater than a reference value, the present invention may determine that the battery is available.

Upon determining that the battery is available, the present invention may create a use enable notification and transmit the same to the user terminal.

On the other hand, when the battery SOH is less than or equal to the reference value, the present invention may determine that the battery is not available.

Upon determining that the battery is not available, the present invention may create a use disable notification and transmit the same to the user terminal.

Then, the present invention may perform user authentication with respect to the user terminal (S200).

Here, the present invention may perform the user authentication based on user information, and match unique identification information of the battery with the user terminal when the user authentication is completed.

For example, the present invention may perform the user authentication as to payment of a user and whether the user is an unauthorized user, based on the user information.

Then, the present invention may determine whether the battery is mounted to a shared mobility device (S300).

Next, the present invention may determine whether use of the shared mobility device is approved (S400).

Here, when the battery is mounted to the shared mobility device, the present invention may be communication-connected with the shared mobility device. Upon being communication-connected with the shared mobility device, the present invention may request use approval to the mobility device, and determine that the use of the shared mobility device is approved, upon receiving a use approval acknowledgement from the mobility device.

For example, the present invention may provide user authentication completion information to the shared mobility device to request the use approval thereto.

Upon determining that the use of the shared mobility device is approved, the present invention may supply electrical energy to the shared mobility device (S500).

Thereafter, the present invention may acquire usage information of the shared mobility device therefrom (S600).

Here, the present invention may acquire the usage information in real time once the mobility device begins to be run.

For example, the usage information may include voltage, current, temperature, position and speed information acquired according to the running of the shared mobility device, but is not limited thereto.

Next, the present invention may transmit the acquired usage information of the shared mobility device and status information of the battery to the user terminal (S700).

Here, the present invention may analyze a running pattern and a battery use pattern of a user using the shared mobility device based on the acquired usage information of the shared mobility device and the status information of the battery and transmit the analyzed user running pattern and battery use pattern to at least one of the user terminal and an external server.

In addition, the present invention may analyze a battery use pattern based on the acquired usage information of the shared mobility device and the status information of the battery and estimate the remaining lifespan of the battery based on the analyzed battery use pattern.

Thereafter, when the battery is detached from the shared mobility device (S800), the present invention may end the control process.

Here, when the running of the shared mobility device is determined to be finished, the present invention may diagnose the entire shared battery system, and end the driving of the shared battery system upon determining based on a result of the diagnosis that the entire shared battery system is normal.

Alternatively, unless the entire shared battery system is normal, the present invention may create notification information regarding an abnormal part of the shared battery system and transmit the same to the user terminal.

Figure 5:
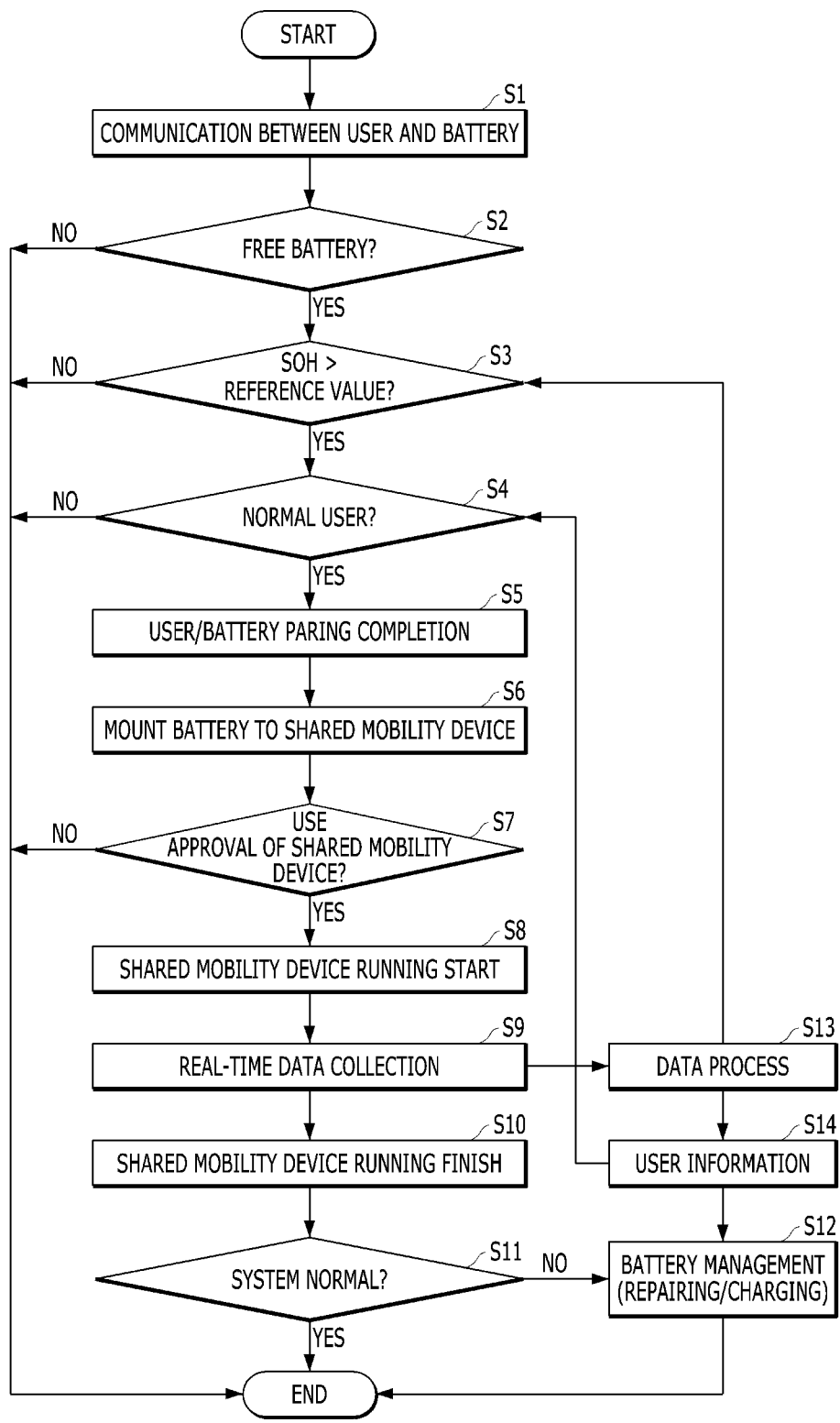
FIG. 5 is a flowchart illustrating a method of controlling a battery of a shared battery system according to another embodiment of the present invention.

FIG. 5 is a flowchart illustrating a method of controlling a battery of a shared battery system according to another embodiment of the present invention.

As shown in FIG. 5, the present invention may make a communication connection with a user terminal (S1).

Then, upon receiving a communication connection request from the user terminal, the present invention may determine whether a communication connection with another user terminal is currently being made (S2).

Unless the communication connection with the other user terminal is currently being made, the present invention may diagnose a State Of Health (SOH) of the battery and determine based on a result of the diagnosis whether the battery is available (S3).

When the battery SOH is greater than a reference value, the present invention may determine that the battery is available, and perform user authentication with respect to the user terminal (S4).

Then, upon completion of the user authentication, the present invention may complete pairing with the user terminal (S5).

Then, the present invention may determine whether the battery is mounted to a shared mobility device (S6).

Then, the present invention may determine whether use of the shared mobility device is approved (S7).

Upon determining that the use of the shared mobility device is approved, the present invention may supply electrical energy to the shared mobility device (S8).

Thereafter, the present invention may acquire usage information of the shared mobility device therefrom once the mobility device begins to be run (S9), and process data based on the acquired usage information of the shared mobility device and status information of the battery (S13).

Then, the present invention may diagnose the battery SOH using the processed data or extract user information using the same (S14) to perform the user authentication.

Next, the present invention may determine whether the running of the shared mobility device is finished (S10).

When the running of the shared mobility device is determined to be finished, the present invention may diagnose the entire shared battery system to determine whether the entire shared battery system is normal (S11).

Upon determining based on a result of the diagnosis that the entire shared battery system is not normal, the present invention may conduct battery management, such as repairing or charging (S12).

Alternatively, upon determining based on the diagnosis result that the entire shared battery system is normal, the present invention may end the driving of the shared battery system.

As described above, the present invention may perform user authentication to match a battery having unique identification information with user information of a user terminal, and allow a user to mount the user information-matched battery to a shared mobility device to use the mobility device, thereby making it possible to minimize a cost required to charge the battery, as well as risk of theft and damage of the battery, through a battery personalization service, and to be applied to all shared mobility devices using the battery.

In addition, according to the present invention, an authentication function may be applied to a battery itself, so that individual-unit charge/discharge information may be used and battery lifespan and SOH information management and battery data collection may be made based on the charge/discharge information.

In addition, according to the present invention, it may be possible to lower the price of a shared electric mobility device, reduce risk of theft and loss of a battery, and supply a larger number of electric mobility devices with respect to the same cost.

In addition, according to the present invention, a personal user may personally perform self-charging, so that there may be no need for a cost required to construct separate charging station infrastructure for charging of an electric mobility device and a corresponding labor cost.

That is, according to the present invention, because a personal user may personally perform self-charging, a manager providing a mobility sharing service may not need to personally collect a shared mobility device such as a bicycle, charge the collected mobility device and then relocate the charged mobility device.

In addition, according to the present invention, even in the case where there is only a mobility device having remaining energy insufficient to arrive at a destination when a user searches for available mobility devices therearound, the user may plan the amount of energy to the destination in advance and conduct charging and scheduling.

That is, according to the present invention, it may be possible to develop a differential fee charging system based on a running pattern of a user.

In addition, even in the case where the present invention is applied to a personal product of an individual, as well as a shared electric mobility device, it may be possible to prevent battery theft and increase convenience of use.

Further, according to the present invention, the flow/path of mobile energy and the amount thereof may be grasped within a grid, thereby making it possible to first secure data for mobile-form smart grid environment construction.

Further, according to the present invention, even though one person uses a plurality of batteries at a time or user information is changed, history management may be made and use of a limited resource (battery) may be maximized through authentication information update.

In this manner, because an individual user may carry a battery and personally perform battery charging, etc., the present invention may be very efficient in management/maintenance and data-based business model establishment.

The present invention may provide a shared battery having a user authentication function, which may be a technique capable of being used by only specific individuals acquiring use approvals of public institutions or shared electric/electronic products (for example, paying the lawful prices).

That is, the present invention may assign specific IDs respectively to auxiliary batteries carried by individuals, determine use approvals based on the assigned IDs, and then drive public institutions/shared electric/electronic products with powers of the auxiliary batteries.

In addition, the present invention may provide a computer-readable recording medium for storing a program for execution of the methods of controlling the battery of the shared battery system according to the embodiments of the present invention, which may execute the processes included in the battery control methods.

The above-described battery control methods of the present invention may be implemented as computer-readable code on the program storage medium. The computer-readable medium may be any type of recording device in which data is stored in a computer-readable manner. The computer-readable medium may include, for example, a hard disk drive (HDD), a solid-state disk (SSD), a silicon disk drive (SDD), a read-only memory (ROM), a random access memory (RAM), a compact disc read-only memory (CD-ROM), a magnetic tape, a floppy disk, and an optical data storage device.

As is apparent from the above description, a shared battery system, a method of controlling a battery thereof and a mobility sharing service system including the same according to at least one embodiment of the present invention may perform user authentication to match a battery having unique identification information with user information of a user terminal, and allow a user to mount the user information-matched battery to a shared mobility device to use the mobility device, thereby making it possible to minimize a cost required to charge the battery, as well as risk of theft and damage of the battery, through a battery personalization service, and to be applied to all shared mobility devices using the battery.

In addition, according to the present invention, an authentication function may be applied to a battery itself, so that individual-unit charge/discharge information may be used and battery lifespan and SOH information management and battery data collection may be made based on the charge/discharge information.

In addition, according to the present invention, it may be possible to lower the price of a shared electric mobility device, reduce risk of theft and loss of a battery, and supply a larger number of electric mobility devices with respect to the same cost.

In addition, according to the present invention, a personal user may personally perform self-charging, so that there may be no need for a cost required to construct separate charging station infrastructure for charging of an electric mobility device and a corresponding labor cost.

That is, according to the present invention, because a personal user may personally perform self-charging, a manager providing a mobility sharing service may not need to personally collect a shared mobility device such as a bicycle, charge the collected mobility device and then relocate the charged mobility device.

In addition, according to the present invention, even in the case where there is only a mobility device having remaining energy insufficient to arrive at a destination when a user searches for available mobility devices therearound, the user may plan the amount of energy to the destination in advance and conduct charging and scheduling.

That is, according to the present invention, it may be possible to develop a differential fee charging system based on a running pattern of a user.

In addition, even in the case where the present invention is applied to a personal product of an individual, as well as a shared electric mobility device, it may be possible to prevent battery theft and increase convenience of use.

Further, according to the present invention, the flow/path of mobile energy and the amount thereof may be grasped within a grid, thereby making it possible to first secure data for mobile-form smart grid environment construction.

Further, according to the present invention, even though one person uses a plurality of batteries at a time or user information is changed, history management may be made and use of a limited resource (battery) may be maximized through authentication information update.

In this manner, because an individual user may carry a battery and personally perform battery charging, etc., the present invention may be very efficient in management/maintenance and data-based business model establishment.

It will be appreciated by those skilled in the art that the effects achievable through the present invention are not limited to those that have been particularly described hereinabove and that other effects of the present invention will be more clearly understood from the above detailed description.

The above detailed description is not to be construed as limiting the present invention in any aspect, but is to be considered by way of example. The scope of the present invention should be determined by reasonable interpretation of the accompanying claims, and all equivalent modifications made without departing from the scope of the present invention should be understood to be included in the following claims.

What is claimed is:

1. A mobility sharing service system comprising:
a shared battery system detachably mounted to a shared mobility device to supply electrical energy thereto;
a user terminal communication-connected with the shared battery system to perform user authentication and receive usage information and battery information of the shared mobility device corresponding to use of the shared mobility device from the shared battery system; and
a mobility sharing service server configured to connect with the user terminal to receive the usage information and the battery information of the shared mobility device from the user terminal and to determine a usage fee based on the received usage information and the battery information,
wherein the shared battery system is configured to:
perform the user authentication upon being communication-connected with the user terminal,
request use approval from the shared mobility device by providing completion information of the user authentication,
supply the electrical energy to the shared mobility device based on the use approval of the shared mobility device upon being mounted to the mobility device,
acquire the usage information of the shared mobility device the shared mobility device, wherein the usage information is acquired in real time while the shared mobility device is operated,
analyze a battery use pattern based on the acquired usage information of the shared mobility device and status information of a battery of the shared battery system,
estimate a remaining lifespan of the battery based on the analyzed battery use pattern, and
transmit the acquired usage information of the shared mobility device and the status information of the battery to the user terminal.

2. The mobility sharing service system according to claim 1, wherein the mobility sharing service server is configured to analyze a running pattern and the battery use pattern of a user using the shared mobility device based on the usage information of the shared mobility device and the battery information and to provide individually tailored fee charging, reward and promotion based on a result of the analysis.

3. The mobility sharing service system according to claim 1, wherein the mobility sharing service server is configured to provide charging station information for charging of the battery to the user terminal.

4. The mobility sharing service system according to claim 1, wherein the shared battery system is configured to diagnose a state of health (SOH) of the battery when the communication connection with the user terminal is made and to determine whether the battery is available based on a result of the diagnosis.

* * * * *